US010894998B2

(12) United States Patent
Bisaka et al.

(10) Patent No.: US 10,894,998 B2
(45) Date of Patent: Jan. 19, 2021

(54) PROCESSING OF IRON-RICH RARE EARTH BEARING ORES

(71) Applicant: MINTEK, Randburg (ZA)

(72) Inventors: Kabwika Bisaka, Randburg (ZA); Itumeleng Thobadi, Randburg (ZA)

(73) Assignee: MINTEK, Randburg (ZA)

(*) Notice: Subject to any disclaimer, the term of this patent is extended or adjusted under 35 U.S.C. 154(b) by 0 days.

(21) Appl. No.: 16/096,905

(22) PCT Filed: Apr. 26, 2017

(86) PCT No.: PCT/ZA2017/050026
§ 371 (c)(1),
(2) Date: Oct. 26, 2018

(87) PCT Pub. No.: WO2017/190162
PCT Pub. Date: Nov. 2, 2017

(65) Prior Publication Data
US 2019/0136343 A1 May 9, 2019

(30) Foreign Application Priority Data
Apr. 26, 2016 (ZA) ................................ 2016/02817

(51) Int. Cl.
*C22B 59/00* (2006.01)
*C22B 5/10* (2006.01)
*C22B 9/10* (2006.01)

(52) U.S. Cl.
CPC ............... *C22B 59/00* (2013.01); *C22B 5/10* (2013.01); *C22B 9/103* (2013.01)

(58) Field of Classification Search
None
See application file for complete search history.

(56) References Cited

FOREIGN PATENT DOCUMENTS

CN 1174242 A 2/1998
KR 20140064426 A 5/2014

OTHER PUBLICATIONS

International Search Report and Written Opinion for Application No. PCT/ZA2017/050026 dated Sep. 20, 2017, 10 pages.
Yagmurlu, Bengi et al., "Combined SAF Smelting and Hydrometallurgical Treatment of Bauxite Residue for Enhanced Valuable Metal Recovery" Travaux 46, Proceedings of 35th International ICSOBA Conference, Hamburg, Germany, Oct. 2-5, 2017, pp. 587-594 (9 pages).

*Primary Examiner* — Melissa S Swain
(74) *Attorney, Agent, or Firm* — Michael Best & Friedrich LLP

(57) ABSTRACT

A method of processing an iron-rich rare earth bearing ore which includes the steps of smelting the ore to concentrate rare earth oxide minerals in the ore into a slag phase and extracting the rare earth oxide minerals from the slag.

7 Claims, 1 Drawing Sheet

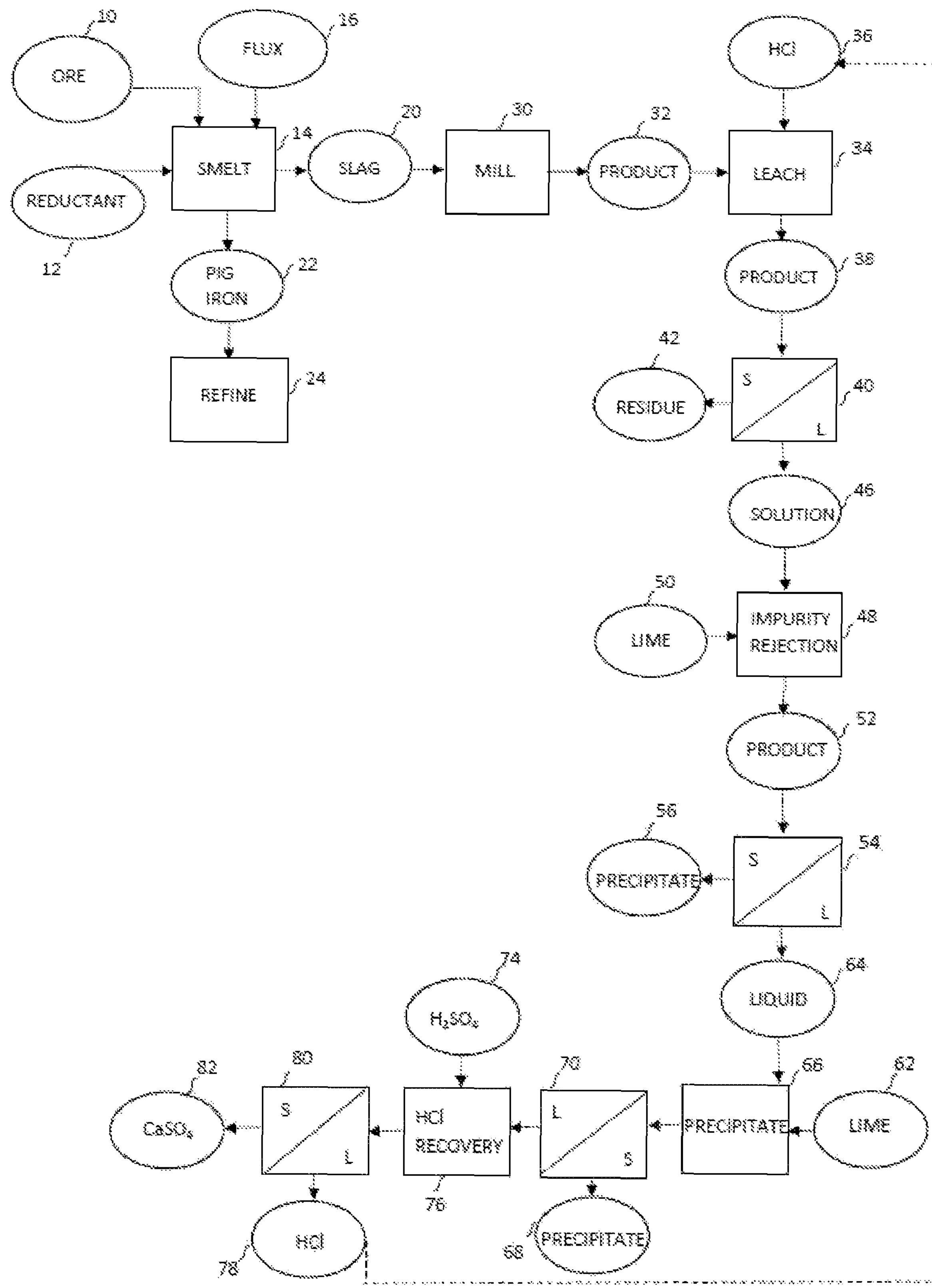
ORE
10
FLUX
16
REDUCTANT
12
SMELT
14
SLAG
20
MILL
30
PRODUCT
32
HCl
36
LEACH
34
PIG IRON
22
REFINE
24
PRODUCT
38
RESIDUE
42
S
L
40
SOLUTION
46
LIME
50
IMPURITY REJECTION
48
PRODUCT
52
PRECIPITATE
56
S
L
54
LIQUID
64
$H_2SO_4$
74
CaSO$_4$
82
S
L
80
HCl RECOVERY
76
L
S
70
PRECIPITATE
66
LIME
62
HCl
78
PRECIPITATE
68

PROCESSING OF IRON-RICH RARE EARTH BEARING ORES

BACKGROUND OF THE INVENTION

This invention relates to the extracting of rare earth minerals from an iron-rich rare earth-bearing ore.

Large deposits of iron-rich rare earth-bearing ores are found worldwide. These ore deposits carry significant reserves of rare earths but, nonetheless, some of these deposits have not been exploited because milling of the ore and physical separation processes to produce a concentrate from which rare earth elements could be extracted by hydrometallurgical means have been found to be challenging, inefficient and uneconomical.

An object of the present invention is to provide a method for extracting rare earth elements from an iron-rich rare earth-bearing ore.

SUMMARY OF THE INVENTION

The invention provides a method of processing an iron-rich rare earth bearing ore which includes the steps of smelting the ore to concentrate rare earth oxide minerals in the ore into a slag phase and extracting the rare earth oxide minerals from the slag.

In the smelting step iron and manganese oxides in the ore may be reduced to a low manganese pig iron in a metal phase.

Smelting of the ore can be effected through the use of a suitable furnace.

The extraction of the rare earth oxide minerals may be carried out in any suitable way. Preferably though the slag is conditioned through controlled cooling and, after solidification, is milled and leached directly or upgraded further by flotation/magnetic separation before leaching.

The slag may be milled to a suitable size, e.g. of the order of −35 micron.

The milled slag may be directly leached in hydrochloric acid or any other suitable lixiviant.

Prior to the extraction step the slag may be treated to enhance the leaching process. For example at least one suitable flux may be added to the melt and conditioning of the slag through controlled cooling may be undertaken. The fluxing may take place in the furnace or the flux may be added to the slag when it is tapped from the furnace, for example into a conditioning casting ladle or into a separate reactor.

Without being restrictive the flux may be lime, $Na_2CO_3$, $K_2CO_3$ and other suitable fluxing agents.

A function of the fluxing is to facilitate the breaking of bonds between spinel phases, rare earth bearing phases and other phases in the slag, with the aim of improving the downstream upgrading and leaching of the slag.

BRIEF DESCRIPTION OF THE DRAWING

The invention is further described by way of example with reference to the accompanying drawing which depicts steps in the method of the invention.

DESCRIPTION OF PREFERRED EMBODIMENT

The accompanying drawing is a flow sheet of steps in a method according to the invention for the extraction of rare earth elements from a mineralogically complex iron-rich rare earth ore 10. Typically rare earth oxide minerals in this type of ore occur in a complex minerology of grains, and crystal clusters of less than 20 micron in size are disseminated through an iron oxide matrix or as coatings on the iron oxide minerals. A conventional milling and physical separation process is generally technically and economically not viable to yield an ore concentrate which can be further processed by hydrometallurgical techniques to obtain the rare earth elements.

The method of the invention uses a selective carbothermic smelting step for concentrating the rare earth oxide species into a slag phase and for precipitating iron and manganese in the ore, as low manganese pig iron, in a metal phase. Thereafter the slag is processed by hydrometallurgical techniques to extract and then to separate the rare earth elements.

Referring to the flow sheet the ore 10 and a suitable reductant 12, e.g. anthracite, are fed in appropriate quantities to a furnace 14. The process energy requirement of the furnace, and the quality and mass of the metal and slag phases produced by the furnace, are dependent on the smelting conditions and particularly on the furnace operating temperature, the composition of the ore 10 and the quantity and quality of the reductant 12. The reductant input is regulated to achieve at least 98% iron reduction to the metal phase, and optimum molten slag properties while the furnace temperature is selected to effect efficient slag-metal separation.

A flux 16 is added (in this example) to the furnace 14 curing the smelting process. The nature of the fluxing is such as to modify the slag, to improve the recovery of major metal values, to improve furnace operation, as well as improve downstream upgrading and leaching of valuable rare earth species in the slag. The flux 16 may be lime, $Na_2CO_3$, $K_2CO_3$ or borax (these flux types are exemplary only and are not limiting). The optimum flux addition may be adjusted according to the type of ore which is being processed.

A slag 20 is tapped from the furnace 14. Depending on the composition of the ore 10 the slag 20 may contain appreciable amounts of BaO, $ThO_2$ and SrO in addition to rare-earth species and other slagging elements such as $SiO_2$, $Al_2O_3$, CaO and MgO.

Apart from concentrating the rare earth elements into the slag phase, the smelting process precipitates manganese and iron into a low-manganese pig iron 22 in the metal phase. The pig iron 22 can be recovered in a downstream process 24 using suitable techniques.

As an alternative to adding the flux 16 to the smelt in the furnace 14 it is possible to add the flux to the slag as it is tapped from the furnace into a separate reactor or into a casting ladle (not shown). Inter alia the fluxing technique is designed to facilitate the breaking of bonds between spinel phases, rare earth bearing-phases and other phases in the slag, with the aim of improving the downstream upgrading and leaching of the slag. It is known that the spinel phases cover the rare-earth oxide grains and prevent or hinder their efficient leaching. Additionally, the fluxing technique which is adopted should be selected to minimise effects such as refractory erosion and off-gas blockages which can disrupt operation of the furnace 14.

The slag 20, once solidified, is milled in a step 30 to produce a milled product 32 of suitable size, e.g. of the order of −35 micron. The product 32 is then directly leached or upgraded before leaching (step 34). Hydrochloric acid 36 is used to leach the slag. The product 38 produced by the leaching step 34 is subjected to a solid/liquid separation step 40 which produces a leach residue 42 which is disposed of by a suitable technique, and a leach solution 46. In a subsequent impurity rejection step 48 lime 50 is added to the leach solution 46. A resulting product 52 is subjected to a solid/liquid separation step 54 to remove impurities 56 such as Al, Fe and Th which are precipitated. Lime 62 is added to liquid 64 coming from the step 54 to precipitate (66) the rare earth elements 68 which are thereafter recovered by a solid/liquid separation step 70.

Sulphuric acid 74 is added in a step 76 to liquid from the separation step 70 to enable hydrochloric acid (78) in solution to be recovered in a solid/liquid separation step 80. A $CaSO_4$ precipitate 82 produced by the step 80 is disposed of in an appropriate way, while the recovered hydrochloric acid 78 is recycled to the direct leaching step 34.

Laboratory and pilot scale tests undertaken to demonstrate the efficiency of the smelting step 14 and the recovery of the rare-earth oxides into the slag 20 have shown that more than 90% of the total rare-earth elements contained in the iron-rich rare earth bearing ore 10 are recovered into the slag phase 20. A concentration ratio of from 4 to 7 times the feed head rate is achieved. A pull mass of from 15% to 25%, and a total rare-earth element recovery from the slag 20 of more than 90%, are measured. The total rare-earth element content in the slag depends on the pull mass and the total rare-earth element grade of the ore 10.

For each unit of the ore 10 which is processed about 0.4 to 0.6 units of pig iron 22 are produced. The pig iron composition varies with the extent of reduction and the nature of the ore 10. Alloys containing from 75 to 97% Fe, and from 1 to 14% Mn, with the balance being mainly Si and C, are produced.

The slags from the laboratory and pilot tests were leached and the leach residues 42 were collected, weighed and sampled for chemical and mineralogical analyses. It is established that the extraction yield of the rare-earth elements is over 90%. The mass of the residue 42 is from 30 to 35% of the initial mass of the slag 20. In general the overall recovery rate of the rare-earth element concentration in the slag 20 to the production of the precipitate 68, is in the range of 80 to 90%.

The economic viability of the process shown in the accompanying flow sheet depends largely on mining and electricity costs and on the total rare-earth element grade of the ore 10. The nature of the furnace crucible which is used during the smelting step 14 can have an effect on technical and economic aspects of the method of the invention. If a graphite crucible is used then the slag 20 need not necessarily be fluxed and direct HCl leaching of the unfluxed slag can be effected. Tests have shown that total rare-earth element leaching efficiencies ranging between 93% and 96%, at different acid dosages, are achieved. Additionally it has been demonstrated that direct HCl leaching of the slag, compared to acid baking and caustic (NaOH) cracking, is preferable. It has also been observed that the extraction efficiency of light rare-earth elements which include La, Ce, Nd and Pr is lowered when the slag is treated with a flux prior to leaching.

A benefit of the fluxing process is that the temperature of the smelting can be decreased from about 1700° to 1600° C. Use of a graphite or carbon-based refractory crucible is preferable as it minimizes the contamination of the slag product and this results in a higher concentration of the rare-earth elements in the slag. It has been noted that due to the effect of chemical erosion the rare-earth oxide grade of the slag produced in an alumina crucible or in an MgO crucible is relatively lower compared to that of the slag produced in a graphite crucible. Virtually no slag contamination took place through the use of a graphite crucible.

Experimental Procedure for the Smelting Tests 1.1 Raw Materials

Ore

Zandkopsdrift (ZKD) iron-rich rare-earth bearing was used. Iron in the ore is in the form of goethite (FeO(OH)). This ore was calcined prior to crucible smelting test work as goethite decomposes at about 300° C. to produce $Fe_2O_3$ and $H_2O$. A summary of the chemical composition of the ore before and after calcining is given in Table 1 and Table 2.

The granulometry of the ore supplied was 100% passing to 5 mm sieve. The ore was milled to 100% passing to 75 micron sieve, which is an adequate size for laboratory test work while −1 mm passing was used for the 100 kVA DC arc smelting test work.

TABLE 1

Summary of the bulk chemical composition of the ZKD ore "as is"

| MgO % | Al2O3 % | SiO2 % | CaO % | TiO2 % | V2O5 % | Cr2O3 % | MnO % | FeO(OH) % | S/A | S/M | P2O5 % |
|---|---|---|---|---|---|---|---|---|---|---|---|
| 1.13 | 6.48 | 6.08 | 2.06 | 3.87 | 0.109 | 0.073 | 9.09 | 46.9 | 0.94 | 5.38 | 1.77 |
| **La ppm** | **Ce ppm** | **Pr ppm** | **Nd ppm** | **Sm ppm** | **Eu ppm** | **Gd ppm** | **Dy ppm** | **Er ppm** | **TREE ppm** | **Th ppm** | **U ppm** |
| 6060 | 10200 | 921 | 3900 | 478 | 145 | 435 | 166 | 99.8 | 23420 | 221 | 71.6 |

Ho, Tm, Lu, Yb;
REE with concentrations less than 100 ppm

TABLE 2

Summary of the bulk chemical composition of the calcined ZKD ore

| MgO % | Al2O3 % | SiO2 % | CaO % | TiO2 % | V2O5 % | Cr2O3 % | MnO % | Fe2O3 % | S/A | S/M | P2O5 % |
|---|---|---|---|---|---|---|---|---|---|---|---|
| 1.6 | 9.29 | 8.01 | 3.47 | 3.97 | 0.117 | 0.03 | 10.8 | 50.1 | 0.86 | 5.01 | NA |

TABLE 2-continued

| Summary of the bulk chemical composition of the calcined ZKD ore | | | | | | | | | | | |
|---|---|---|---|---|---|---|---|---|---|---|---|
| La ppm | Ce ppm | Pr ppm | Nd ppm | Sm ppm | Eu ppm | Gd ppm | Dy ppm | Er ppm | TREE % | Th ppm | U ppm |
| 6756 | 11233 | 1222 | 4133 | 443 | 117 | 355 | 164 | 954 | 2.57 | 279 | NA |

Ho, Tm, Lu, Yb;
REE with concentrations less than 100 ppm;
S = $SiO_2$;
A = $Al_2O_3$;
M = MgO
NA: not analysed Anthracite The particle size distribution of the as-is anthracite was 100% passing to a sieve of 5 mm size. It was milled to 100% passing to a 75 micron sieve for the crucible tests and used as-is in the 100 kVA DC arc smelting tests. The approximate analysis of the anthracite used is given in Table 3.

TABLE 3

| Summary of the bulk chemical composition of the anthracite (mass %) | | | |
|---|---|---|---|
| Ash | Volatile | Fixed Carbon | Total Sulphur |
| • 4.74 | • 6.19 | • 89.1 | 0.56 |

Fluxes

High purity laboratory grade $Na_2CO_3$, $K_2CO_3$, borax and CaO are used as fluxing agents.

1.2 Laboratory Smelting Test Work

Laboratory tests were conducted in 60 kW and 30 kW induction furnaces.

The raw material components at specified composition according to the test recipe in Table 4 were blended and packed in either an alumina, magnesite or graphite crucible. Power was increased at a rate of 20° C. per minute until the target temperature was reached. Thereafter the crucible was held for specified durations at the target temperature. The furnace power was then switched off and the crucible was left to cool in an argon gas atmosphere inside the furnace.

TABLE 4

Conditions for laboratory smelting tests

| Test | Anthracite % | Fluxes, % $Na_2CO_3$ | Borax | $K_2CO_3$ | CaO | Temperature, ° C. | Crucible |
|---|---|---|---|---|---|---|---|
| | variation of anthracite addition and temperature | | | | | | |
| 1 | 100 | | | | | 1700 | Al |
| 2 | 90 | | | | | 1700 | Al |
| 3 | 80 | | | | | 1600 | Al |
| 4 | 70 | | | | | 1600 | Al |
| | Variation of crucibles and temperature | | | | | | |
| 5 | 100 | | | | | 1700 | MgO |
| 6 | 100 | | | | | 1700 | G |
| | Variation of flux addition and temperature | | | | | | |
| 7 | 100 | 5 | | | | 1600 | G |
| 8 | 100 | 10 | | | | 1600 | G |
| 9 | 100 | 25 | | | | 1600 | G |
| 10 | 100 | 50 | | | | 1600 | G |
| 11 | 100 | | 5 | | | 1600 | G |
| 12 | 100 | | | 5 | | 1600 | G |

TABLE 4-continued

Conditions for laboratory smelting tests

| Test | Anthracite % | Fluxes, % $Na_2CO_3$ | Borax | $K_2CO_3$ | CaO | Temperature, ° C. | Crucible |
|---|---|---|---|---|---|---|---|
| 13 | 100 | | | 50 | | 1600 | G |
| 14 | 100 | 50 | | | | 1700 | G |
| 15 | 100 | | | | | 1800 | G |
| 16 | 100 | | | | 1 | 1700 | G |
| 17 | 100 | | | | 3 | 1700 | G |
| 18 | 100 | | | | 7 | 1700 | G |
| 19 | 100 | | | | 1 | 1600 | G |
| 20 | 100 | | | | 3 | 1600 | G |
| 21 | 100 | | | | 7 | 1600 | G |

1.3 Dc Arc Furnace Test Work

Facility Description

The facility used in the preliminary investigation of the smelting of ZKD ore consisted of a DC power supply, a furnace and an off-gas handling system. Manual feeding was employed.

Testing Conditions

A blend of ore and reductant was fed to the DC arc furnace. In total, six batches were processed. Two batches contained calcined ore. In the five first batches, the blend was manually fed into the pot through a roof feed port of the furnace. The sixth batch (Batch 6) was fed all at once when the pot was hot enough. The test work was conducted according to the conditions (feed and energy supply) given in Table 5.

TABLE 5

100 kVA DC smelting test work conditions.

| Test | | Ore Condition | Power [kW] | Objective |
|---|---|---|---|---|
| 22 | Batch 1 | Calcined ore | 50 | Warm-up & baseline |
| 23 | Batch 2 | Calcined ore | 50 | Slag and Metal production |
| 24 | Batch 3 | Calcined ore | 50 | Slag and Metal production |
| 25 | Batch 4 | As is | 60 | Slag and Metal production |
| 26 | Batch 5 | As is | 60 | Slag and Metal production |
| 27 | Batch 6 | As is | 45 | Slag and Metal production |

2. Results and Discussion 2.1 Smelting Tests

The main objective of all the smelting test work was to investigate the smelting conditions that would yield an optimal grade of the rare-earth bearing slag. The test work was conducted with the aim of providing the optimal smelting recipe(s), operating temperature(s) as well as the characteristics of the products that would be generated. Concentration of rare-earth elements in the slag, clean separation between slag and metal products as well as the amenability to leaching of the slag product were the main parameters for the evaluation of the smelting process.

Overview of Test Work Development—Thermodynamic Evaluation

Smelting Operation

The liquidus temperature of the fluxless smelting test work slag was determined. The unfluxed slag composition was estimated to be 44% $Al_2O_3$-14% CaO-42% $SiO_2$ when FeO was fully reduced and MgO was assumed to be negligible. The melting point of this slag was thus estimated to be between 1600 and 1700° C. using an $Al_2O_3$—CaO—$SiO_2$ phase diagram.

The other components not accounted for in the $Al_2O_3$—CaO—$SiO_2$ phase diagram, are expected to have effects on the liquidus temperature of the slag. FactSage thermodynamic package was used to investigate and predict the effects of these other slag components on the slag liquidus temperature and viscosity. Table 6 shows different possible slag compositions and their relative melting points as predicted by FactSage. The liquidus temperature predictions are done assuming an oxygen partial pressure of 1 atm and also at a typical iron making oxygen partial pressure of $1^{-10}$ atm.

tive. Based on the ternary phase diagram and FactSage thermodynamic predictions, the test programme was developed as follows.

(A) Fluxless smelting at different anthracite additions to investigate the effects of residual FeO in the slag on the slag smelting temperature and fluidity (to improve metal-slag separation).

Tests conducted at 1600° C.; decreasing anthracite additions will increase residual FeO in the slag, and thus lower the operating temperatures. Solid $AlCeO_3$ may still exist in the slag.

(B) Fluxless smelting at 100% anthracite addition in different crucibles, with the objective of optimising the grade (concentration) of REE in the resulting slag and the quality of metal-slag separation Tests conducted at 1700° C. in all crucible types. Besides the effect of temperature, the presence of perovskite solid phase as well as the basicity index may be the main parameters affecting the viscosity of the liquid slag and thus the quality of metal-slag separation; however the experimental tests would validate this.

TABLE 6

FactSage data used to predict the operating temperatures of the different conditions

| | Slag composition, % | | | | | | | | P O2 = 1 atm | | PO2 = log-10 atm | |
|---|---|---|---|---|---|---|---|---|---|---|---|---|
| Composition | Al2O3 | SiO2 | CaO | MgO | TiO2 | MnO | FeO | Ce2O3 | T ° C. | Liquid % | T ° C. | Liquid % |
| 1 | 44 | 42 | 14 | | | | | | 1620 | 100 | 1620 | 100 |
| 2 | 33 | 31 | 10.5 | 5.75 | 19.7 | | | | 1470 | 99.5 | 1468 | 99.8 |
| 3 | 52.7 | 16.3 | 5.6 | 6.9 | 9.4 | 6.48 | 2.51 | | 1678 | 99.9 | 1668 | 99.5 |
| 4 | 49.7 | 15.4 | 5.3 | 6.51 | 8.9 | 10.7 | 3.55 | | 1653 | 100 | 1646 | 99.7 |
| 5 | 47.5 | 14.7 | 5.1 | 6.21 | 8.5 | 13.6 | 4.52 | | 1631 | 100 | 1625 | 99.8 |
| 6 | 46.4 | 14.4 | 5 | 6.08 | 8.3 | 13.3 | 6.63 | | 1615 | 100 | 1610 | 99.8 |
| 7 | 49.3 | 15.3 | 5.3 | 6.46 | 8.8 | 6.06 | 2.35 | 6.46 | 1710 | 91.6 | 1696 | 91.1 |
| MgO refractory compositions, with high MgO in slag | | | | | | | | | | | | |
| 8 | 24.5 | 16 | 6.7 | 28.8 | 9.8 | 11.7 | 2.45 | | 1690 | 99.9 | 1705 | 99.8 |
| 9 | 23.1 | 15 | 6.4 | 27.2 | 9.2 | 11 | 2.31 | 5.78 | 1725 | 92.4 | 1715 | 91.6 |
| Graphite refractory test with relatively lower $Al_2O_3$ and MgO in slag | | | | | | | | | | | | |
| 10 | 38 | 20.9 | 13.2 | 6.98 | 13.2 | 5.43 | 2.33 | | 1567 | 100 | 1551 | 99.8 |
| 11 | 32.9 | 18.1 | 11.4 | 6.04 | 11.4 | 4.7 | 2.01 | 13.4 | 1549 | 82.4 | 1537 | 82.3 |

TABLE 7

FactSage data used to predict the operating temperatures for the fluxed smelting tests.

| | Slag composition, % | | | | | | | | Flux, % | | | P O2 = 1 atm | | PO2 = log-10 atm | |
|---|---|---|---|---|---|---|---|---|---|---|---|---|---|---|---|
| composition | Al2O3 | SiO2 | CaO | MgO | TiO2 | MnO | FeO | Ce2O3 | Borax | Na2CO3 | K2CO3 | T ° C. | Liquid % | T ° C. | Liquid % |
| 12 | 31.3 | 17.3 | 10.9 | 5.75 | 10.9 | 4.47 | 1.92 | 12.8 | 4.8 | | | 1424 | 83.3 | 1419 | 83.2 |
| 13 | 26.3 | 14.5 | 9.1 | 4.83 | 9.1 | 3.76 | 1.61 | 10.7 | | 20 | | 1478 | 86 | 1396 | 77.6 |
| 14 | 26.3 | 14.5 | 9.1 | 4.83 | 9.1 | 3.76 | 1.61 | 10.7 | | | 20 | 1623 | 86 | — | |

Overall, the data generated from Factsage gave an indication that a portion of the rare-earth oxides in the slag would be in the form of a solid solution of $AlCeO_3$ which may affect the viscosity of the slag, in spite of relatively lower slag liquidus temperatures of the different planned smelting conditions. The viscosity can be decreased by addition of fluxes such as CaO. However these effects will be weighed against the recovery of REE to the slag; the highest REE concentration in the slag is the primary objec- (C) Tests to investigate the effects of different slag modifying fluxes ($Na_2CO_3$, $K_2CO_3$ and borax) on the smelting and extraction of REE in the leaching step.

These tests were conducted at 1600° C. According to the FactSage simulations, they would result in a relatively lower slag liquidus temperature, however because of the possible presence of solid perovskite phase and that the slag may be acidic, a higher temperature may be required to decrease the slag viscosity, and also to keep molten the pig iron produced. Graphite crucibles are used because these fluxes are aggressive to refractories.

(D) Additional tests to improve the metal-slag separation by decreasing viscosity.

(E) A $Na_2CO_3$ flux test at 1700° C. compared to 1600° C. to evaluate the effects of a higher temperature on the viscosity and separation of metal and slag.

(F) An unfluxed test in a graphite crucible at 1800° C., also to investigate the effects of higher temperature on metal-slag separation. Additional tests at relatively lower CaO flux additions at 1 to 7% relative to ore input.

These tests were conducted at 1600 and 1700° C. to investigate the effect of slag basicity on metal-slag separation.

Distribution of Rare-Earth Elements

Pyrosim and FactSage thermodynamic packages were used to estimate the distribution of rare-earth elements to the products of the smelting process. The following conditions were considered:

(A) Ore analyses based on the ZKD ore given in Table 1 and Table 2 of the raw material analyses.

(B) 100% stoichiometric carbon added for the reduction of $Fe_2O_3$, MnO and $P_2O_5$.

(C) Operating temperature of 1700° C. $Ce/Ce_2O_3$ was used to represent the total rare-earth elements/oxides in the FactSage while yttrium was used in a Pyrosim model. Only the metal and slag chemical analyses and recoveries for selected elements predicted by the models are summarised in Table 8 and Table 9.

TABLE 8

Chemical analyses/slag quality in mass %

| Slag | $Al_2O_3$ | SiO2 | CaO | MgO | TiO2 | MnO | FeO | $Y_2O_3$ |
|---|---|---|---|---|---|---|---|---|
| Pyrosim | 25.0 | 23.2 | 7.95 | 4.36 | 13.4 | 16.1 | 2.10 | 7.24 |
| FactSage | 21.3 | 22.3 | 7.54 | 4.13 | 13.7 | 28.7 | 2.33 | 2.93 |

| Metal | Fe | Mn | P | C | Re/Y |
|---|---|---|---|---|---|
| Pyrosim | 87.0 | 10.2 | 1.59 | 0.312 | — |
| FactSage | 90.1 | 2.21 | 1.48 | 5.78 | — |

TABLE 9

Recovery of essential elements in mass %

| Slag | $Al_2O_3$ | $SiO_2$ | CaO | MgO | $TiO_2$ | MnO | FeO | $Y_2O_3$ |
|---|---|---|---|---|---|---|---|---|
| Pyrosim | 99.9 | 99.1 | 99.9 | 99.8 | 99.0 | 42.4 | 1.20 | 100 |
| FactSage | 85.4 | 95.4 | 95.2 | 94.9 | 91.9 | 76.0 | 1.19 | — |

| Metal | Fe | Mn | P | C | Re/Y |
|---|---|---|---|---|---|
| Pyrosim | 98.5 | 57.6 | 100 | 0.99 | $1.00^{-6}$ |
| FactSage | >99.0 | 11.1 | 75.6 | — | |

The theoretical predictions indicate that all the rare earths report to the slag phase as rare-earth oxides. The Pyrosim model gives a slag phase with a REE concentration 4 times that in the ore while the FactSage model predicts a relatively lower REE concentration in the slag at 2.93 times. The lower REE concentration predicted by Factsage is mainly attributed to a relatively lower MnO reduction as compared to that of the Pyrosim model. The calculated content of Ce in the FactSage metal is 0.000001% at 1700° C., which also indicates that all the rare earth oxides report to the slag phase. In practice, the presence of the solid $AlCeO_3$ phase in the slag will not have an overall effect on the slag final grade while a more efficient reduction of MnO is possible. The actual concentrations of rare earths in the slag may be higher than predicted levels. The metal to slag ratio predicted by Pyrosim is 1.56 while that predicted by FactSage is 1.46; meaning a relatively lower slag tonnage as compared to that of the metal will be produced from these recipes. Minimising the slag tonnage and optimising its grade in REE minimise impurities to the hydrometallurgical plant, reduce consumption of consumables in the extraction process and as minimise plant size and its capital cost.

Estimation of Viscosity of Rare-Earth Oxide-Containing Melt

The slag produced is largely constituted of FeO, MnO, $SiO_2$, $Al_2O_3$, CaO and MgO with a portion of up to 13% $RE_2O_3$. Rough analysis of the slag viscosity was done by ignoring the $RE_2O_3$ portion, although thermodynamically not correct. FactSage® 7.0 was used to estimate the viscosity of the portion of the melts composed of $SiO_2$, $Al_2O_3$, CaO and MgO by normalising the slag composition to four components, i.e., $SiO_2$, $Al_2O_3$, CaO and MgO. FeO and MnO were assumed to fully reduce; which would be an ideal situation. The FTOxid database was used to calculate the liquidus of the melt as well as the phase composition of the melt at 1600° C. The viscosity module from FactSage was used to calculate the viscosity of the liquid at the liquidus temperature. For the calculations at 1600° C., the viscosity of the liquid portion of the melt was calculated using the viscosity module in FactSage and then adjusted to an "apparent" viscosity of the overall melt, using the Roscoe relationship to account for solids that are present in the melt (spherical particles were assumed).

As a result of refractory erosion when operated in alumina and magnesia crucibles, viscous slags of higher liquidus temperature would be produced in Tests 1 to 6 shown in Table 10. In these slags, alumina solid solutions are precipitated. However the presence of FeO and increased temperature will increase the fluidity of these slags.

Lower liquidus slags below 1600° C. (in the absence of rare-earth oxides) are produced in the graphite crucible; the viscosity of these slags is relatively high. Good separation of metal and slag is achieved in Tests 5, 14 and 15; these slags have lower viscosity and a slightly higher basicity index. Increasing the slag basicity index by adding lime was employed to improve the slag-metal separation.

TABLE 10

Normalised compositions, liquidus temperatures and viscosity calculation results

| Test | MgO | $Al_2O_3$ % | $SiO_2$ | CaO | Liquidus ° C. | Viscosity Poise | % Liquid | Viscosity mass % | Apparent | Solids |
|---|---|---|---|---|---|---|---|---|---|---|
| 1 | 4.28 | 69.3 | 19.6 | 6.82 | 1843 | 1.24 | 56.4 | 11.9 | 109 | $Al_2O_3$ |
| 2 | 3.71 | 72.6 | 17.9 | 5.79 | 1872 | 1.03 | 50.1 | 13.1 | 216 | $Al_2O_3$ |
| 3 | 4.56 | 51.7 | 32.7 | 11.1 | 1678 | 6.81 | 87.8 | 17.8 | 27.9 | $Al_2O_3$ |

TABLE 10-continued

| Normalised compositions, liquidus temperatures and viscosity calculation results | | | | | | | | | | |
|---|---|---|---|---|---|---|---|---|---|---|
| Test | MgO | $Al_2O_3$ % | $SiO_2$ | CaO | Liquidus ° C. | Viscosity Poise | % Liquid | Viscosity mass % | Apparent | Solids |
| 4 | 4.75 | 48.7 | 34.6 | 11.9 | 1644 | 10.2 | 93.3 | 17.8 | 22.6 | $Al_2O_3$ |
| 5 | 38.6 | 21.2 | 30.2 | 10.1 | 1989 | 0.3 | 81.1 | 1.59 | 3.33 | $MgAl_2O^{4+}$ MgO |
| 6 | 8.12 | 37.8 | 38.6 | 15.5 | 1488 | 32.6 | 100 | 12.6 | 12.6 | — |
| 7 | 7.51 | 39.8 | 39.4 | 13.2 | 1527 | 30.4 | 100 | 16.2 | 16.2 | — |
| 8 | 6.99 | 39.8 | 40.2 | 13 | 1530 | 34 | 100 | 18.4 | 18.4 | — |
| 9 | 7.77 | 35.8 | 42.9 | 13.6 | 1469 | 64.7 | 100 | 19.2 | 19.2 | — |
| 10 | 7.81 | 35.2 | 42.9 | 14 | 1458 | 69.3 | 100 | 18.6 | 18.6 | — |
| 11 | 7.2 | 44.4 | 29.8 | 18.6 | 1578 | 8.73 | 100 | 8.81 | 8.81 | — |
| 12 | 7.46 | 40 | 38.2 | 14.3 | 1525 | 27 | 100 | 14.3 | 14.3 | — |
| 13 | 10.7 | 37.8 | 36.4 | 15.2 | 1547 | 12.3 | 100 | 8.32 | 8.32 | — |
| 14 | 10.8 | 41.1 | 29.5 | 18.7 | 1646 | 3.77 | 94.4 | 5.56 | 6.78 | $MgAl_2O^4$ |
| 15 | 11.2 | 42.8 | 26.4 | 19.6 | 1695 | 2.39 | 88.4 | 4.94 | 7.56 | $MgAl_2O^4$ |

3. Experimental Results

Mass Balance and Test Work Overview

The overall mass balance of the laboratory smelting test work is given in Table 11 and Table 12. These tables include the masses of the raw materials (ore, flux and reductant), slag and metal products for the various conditions investigated. The tests are grouped below according to particular objectives investigated.

Tests 1 to 4 investigated the effect of anthracite addition on the slag quality and melting temperature for tests carried out in alumina crucibles. Tests 1 to 4 demonstrated (validated) that the melting point of the slag decreases with decreasing anthracite addition as predicted by FactSage. The optimal operating condition could not be assessed as the resulting slags were contaminated by eroded refractory material; REO contents in the slag were diluted.

Tests 1, 5 and 6 investigated the effect on the slag chemistry and final slag REO content of using different crucibles/refractories (as a result of crucible erosion). Tests 1, 5 and 6 were carried out in alumina, magnesite and graphite crucibles, respectively. The metal-slag separation in these tests seemed good. The best refractory is the one that has minimal erosion (or contaminates least) by the primary slag generated by the ore (and will subsequently provide optimal REO concentration in the slag). In addition, the slag thus produced should also be leachable. Test 6 gave the best results and subsequent tests were carried out in graphite crucibles.

Tests 7 to 13 investigated the effects of different flux additions on the slag phases produced for leaching purposes. These tests were all conducted in graphite crucibles because of the corrosive nature of the fluxes used towards alumina and magnesite refractories. The metal and slag masses for Tests 7 to 13 conducted at 1600° C. were not recorded and only the combined masses of slag and metal are presented. All the tests led to virtually no metal-slag separation. Smelting of the ore were effective at 1600° C. as is observed from visual inspection of the crucible products. The separation is most probably affected by the high slag viscosity which could be a result of low basicity index and the presence of solids (as indicated in the results of FactSage in Table 7). Whilst the addition of slag modifiers lowers the liquidus temperature of the slag, a portion of rare-earth oxides in the slag may exist as a high melting point solid.

Tests 14 to 21 were conducted to investigate conditions leading to improved metal-slag separation. Test 14 was conducted at 1700° C. to investigate the effect of temperature increase on the metal-slag separation of tests fluxed with $Na_2CO_3$, specifically Test 10. Test 15 was conducted at 1800° C. to investigate the effect of temperature increase on the metal-slag separation of Test 6 which was unfluxed. The slag-metal separation of Tests 14 and 15 appeared better than that of Test 10 and Test 6, respectively.

Tests 16 to 21 was fluxed with varying levels of CaO to evaluate the effect of increasing slag basicity index on metal-slag separation as well as on the reduction of MnO. These were conducted in graphite crucibles to evaluate them against fluxless Test 6. Tests 16 to 18 were conducted at 1700° C. and Tests 19 to 21 were conducted at 1600° C. to evaluate the effect of basicity index on the liquid us temperature. As indicated in the mass balance results in Table 12, these fluxed tests resulted in much better metal-slag separation. The chemical analyses indicated increased basicity index resulted in increased reduction of MnO. Tests 19 to 21 demonstrated that the addition of CaO also lowered the liquidus temperature of the slag; more efficient smelting was carried at 1600 and 1700° C. was compared to Test 6 with no flux addition. The chemical analyses of all the tests follow.

TABLE 12

| Additional tests - mass balance | | | | | | | | | | | | |
|---|---|---|---|---|---|---|---|---|---|---|---|---|
| Anthracite | Fluxes | | | | Total mass In | Products (g) | | | | | | T oC |
| | | | | | | | | | Gas/ | | | |
| (g) | $Na_2CO_3$ | Borax | $K_2CO_3$ | CaO | (g) | Alloy + slag | Alloy | Slag | LOI | Total | Crucible |
| Varying temperature and adding CaO flux to improve viscosity/slag and metal separation | | | | | | | | | | | |
| 30 | 26.7 | | | | 257 | 127 | 63.4 | 63.6 | 124 | 251 | G 1700 |
| 60 | | | | | 460 | 249 | 164 | 85 | 211 | 457 | G 1800 |
| 16 | | | | 0.5 | 116.5 | 66.3 | 44.3 | 22 | 50.2 | 116.5 | G 1700 |

TABLE 12-continued

| Additional tests - mass balance | | | | | | | | | | | |
|---|---|---|---|---|---|---|---|---|---|---|---|
| Anthracite | Fluxes | | | | Total mass In | Products (g) | | | | | T oC |
| (g) | $Na_2CO_3$ | Borax | $K_2CO_3$ | CaO | (g) | Alloy + slag | Alloy | Slag | Gas/ LOI | Total | Crucible |
| Varying temperature and adding CaO flux to improve viscosity/slag and metal separation | | | | | | | | | | | |
| 16 | | | | 1.4 | 117.4 | 67.6 | 43.4 | 24.2 | 49.8 | 117.4 | G 1700 |
| 16 | | | | 3.2 | 119.2 | 70.8 | 42.9 | 27.9 | 48.4 | 119.2 | G 1700 |
| 16 | | | | 0.5 | 116.5 | 70.8 | 42.1 | 28.7 | 45.7 | 116.5 | G 1600 |
| 16 | | | | 1.4 | 117.4 | 71.5 | 40.6 | 30.9 | 45.8 | 117.4 | G 1600 |
| 16 | | | | 3.2 | 119.3 | 74.5 | 42.5 | 32 | 44.8 | 119.3 | G 1600 |

TABLE 11

| Mass balance | | | | | | | | | | | | | |
|---|---|---|---|---|---|---|---|---|---|---|---|---|---|
| | Ore | Anthracite | Fluxes | | | | Total mass In | Products (g) | | | | Total mass out | T oC |
| Test | (g) | (g) | $Na_2O_3$ | Borax | $K_2CO_3$ | CaO | (g) | Alloy + sl | Alloy | Slag | Gas/LOI | (g) | Crucible |
| | | | variation of anthracite addition and temperature | | | | | | | | | | |
| 1 | 100 | 16 | | | | | 116 | 76.2 | 40.8 | 35.4 | 39.8 | 114 | Al 1700 |
| 2 | 100 | 14 | | | | | 114 | 57.4 | 34.5 | 22.9 | 56.6 | 114 | Al 1700 |
| 3 | 100 | 12.5 | | | | | 113 | 81.3 | 36.9 | 44.4 | 31.2 | 114 | Al 1600 |
| 4 | 100 | 11 | | | | | 111 | 78 | 36.5 | 41.5 | 33 | 107 | Al 1600 |
| | | | Variation of crucibles and temperature | | | | | | | | | | |
| 5 | 100 | 16 | | | | | 116 | 79.1 | 42.9 | 36.2 | 34.3 | 113 | Mg 1700 |
| 6 | 400 | 60 | | | | | 460 | 265 | 158 | 107 | 192 | 457 | G 1700 |
| | | | Variation of slag modifying flux addition and temperature | | | | | | | | | | |
| 7 | 200 | 30 | 2.67 | | | | 233 | 146 | NA | NA | 87 | 233 | G 1600 |
| 8 | 200 | 30 | 5.33 | | | | 235 | 125 | NA | NA | 111 | 235 | G 1600 |
| 9 | 200 | 30 | 13.3 | | | | 243 | 138 | NA | NA | 105 | 243 | G 1600 |
| 10 | 200 | 30 | 26.7 | | | | 257 | 128 | NA | NA | 129 | 257 | G 1600 |
| 11 | 200 | 30 | | 2.67 | | | 233 | 123 | NA | NA | 109 | 233 | G 1600 |
| 13 | 200 | 30 | | | 26.7 | | 257 | NA | NA | NA | NA | NA | G 1600 |

NA- No metal slag separation either due to crucible failure or due to poor slag metal separation; metal entrainment in slag Chemical Analysis of Slag The chemical analyses of the slag are given in Table 13 and Table 14.

Tests 1 to 4: The metal-slag separation is good. The slags contained a relatively lower concentration of REO as a result of contamination by alumina eroded from the crucible refractory as well as relatively higher FeO contents in tests conducted with relatively lower than the stoichiometric amount of anthracite additions. The basicity indexes are lower than 0.2. The slag $RE_2O_3$ concentrations ranged from 4.09 to 6.36%.

Test 5: The metal-slag separation is also good. The slag contained lower $RE_2O_3$ concentration at 5.36% due to contamination of the slag by MgO eroded from the MgO crucible. The slag had a relatively higher slag basicity index at 0.93 and this had a positive effect on MnO reduction. The concentration of MnO in the slag is lower than that for slags from Tests 1-4 conducted in alumina crucibles.

Test 6: The metal-slag separation is good. The $RE_2O_3$ grade of the slags produced in the graphite crucible at 11.6% is higher than that in alumina and MgO crucibles. Virtually no slag contamination took place in the graphite crucible as is observed in the alumina and MgO crucibles. Graphite crucible erosion contributes to provide an excessive reducing environment, which resulted in a higher reduction of MnO than in the alumina and MgO crucibles. However a relatively higher FeO content in the slag at 3.16% is observed. Iron speciation analyses on the slag revealed that FeO (reported as Fe2+) in the slag is in fact 2.2%. The slag contained 4.2% entrained Fe. The entrainment of submicron metallic prills to the slag could be attributed to a relatively higher slag viscosity/higher liquidus temperature as is predicted in the FactSage model for high REO contents in the slag. Higher rare earth concentrations in the slag may result in a higher liquidus temperature and a significant amount of solid perovskite phase ($AlCeO_3$). Between the unfluxed different crucible tests (1, 5 and 6), fluxless smelting in a graphite crucible is more preferable.

Tests 7 to 13: Metal-slag separation is poor. Clean slag pieces were collected and analysed. The REO concentration is relatively higher in the range of 7.13-11.9%. Because these tests were carried out in graphite crucibles and thus in excessively reducing environment, relatively higher reductions of iron and manganese were observed. The FeO levels ranged between 0.19 and 4.98%. The entrainment of Fe metal prills in the slag ranged from 2.8 to 32.4%. Poor metal-slag separation could be attributed to high slag viscosity, which would be a result of low basicity index and possibly high liquidus temperature (as a result of high REO content).

Tests 14 and 15: These tests were carried out to investigate means to improve the metal-slag separation. Increasing temperature appeared to have a positive effect on the slag viscosity and reduction of reducible oxides. Based on the Fe analyses in the slag, Test 14 metal-slag separation is better than Tests 7 to 13 separations, and Test 15 separation is better than that achieved in Test 6, Fe content in the slag is relatively low.

Tests 16 to 21: Fluxing the smelting recipe with lime was investigated to improve the metal-slag separation. Good metal-slag separation was achieved at all CaO levels and operating temperatures. This is attributed to increased slag basicity index as a result of lime addition as a fluxing agent to the smelting recipe. The grade of REO in the slag is in the range of 10.9-13.8% for Test 16-18 and 8.39-8.87% for tests 19 to 21. The slag REO grades of Tests 19-21 conducted at 1600° C. are relatively lower than those of Tests 16 to 18, due to higher reduction of MnO at 1700° C. than at 1600° C. At 1600° C., anthracite addition may be increased to improve the reduction of MnO and subsequently the content of REO in the slag.

Compared to the optimal unfluxed condition in Test 6, the addition of CaO was found to be optimal in the tests that resulted in good metal-slag separation with REO grade at least equal to that in Test 6 slag. Tests 16 and 17 met these requirements. The slag REO grades are 13.6% and 12.5%, respectively as reported in Table 13. Improved reduction of MnO was achieved in these tests compared to Test 6 as a result of increased slag basicity and operating temperature (1700° C.).

In larger commercial operations, CaO additions of up to 3% may be carried out as these will result in higher REO, lower FeO, lower MnO in the slag as well as better furnace operation, better metal-slag separation, and virtually no metal entrainment in the slag. However, the most important parameter for the optimal recipe, either unfluxed or fluxed, is the amenability of the slags to be leached efficiently.

TABLE 14

Chemical composition of the other metal oxides in slag, with total REO

| Test | MgO % | $Al_2O_3$ % | $SiO_2$ % | CaO % | $TiO_2$ % | $V_2O_5$ % | $Cr_2O_3$ % | MnO % | FeO % | Fe entrained | Bi | S/A | S/M | REE % | $RE_2O_3$ (REO) % |
|---|---|---|---|---|---|---|---|---|---|---|---|---|---|---|---|
| 1 | 2.86 | 46.3 | 13.1 | 4.56 | 7.47 | 0.09 | 0.07 | 10.3 | 2.45 | — | 0.12 | 0.28 | 4.58 | 4.65 | 5.44 |
| 2 | 2.49 | 48.7 | 12 | 3.88 | 6.47 | 0.14 | 0.1 | 13.2 | 3.1 | — | 0.1 | 0.25 | 4.82 | 3.49 | 4.09 |
| 3 | 2.4 | 27.2 | 17.2 | 5.82 | 8.81 | 0.23 | 0.07 | 19.1 | 4.09 | — | 0.19 | 0.63 | 7.17 | 5.84 | 6.84 |
| 4 | 1.92 | 19.7 | 14 | 4.81 | 7.49 | 0.21 | 0.08 | 17.4 | 11 | — | 0.2 | 0.71 | 7.29 | 5.43 | 6.36 |
| 5 | 24.8 | 13.6 | 19.4 | 6.51 | 9.52 | 0.09 | 0.07 | 7.37 | 0.98 | — | 0.95 | 1.43 | 0.78 | 5.36 | 6.3 |
| 6 | 5.24 | 24.4 | 24.9 | 9.97 | 10.5 | 0.1 | 0.08 | 5.81 | 3.16 | — | 0.31 | 1.02 | 4.75 | 9.86 | 11.6 |
| 7 | 3.94 | 20.9 | 20.7 | 6.95 | 6.85 | 0.3 | 0.11 | 19.5 | 1.75 | — | 0.26 | 0.99 | 5.25 | 10.1 | 11.9 |
| 8 | 3.53 | 20.1 | 20.3 | 6.59 | 6.13 | 0.23 | 0.1 | 16.5 | 2.08 | — | 0.25 | 1.01 | 5.75 | 9.72 | 11.4 |
| 9 | 4.84 | 22.3 | 26.7 | 8.45 | 9.05 | 0.11 | 0.09 | 9.07 | 1.7 | 9.28 | 0.27 | 1.2 | 5.52 | 7.35 | 8.61 |
| 10 | 4.48 | 20.2 | 24.6 | 8.05 | 5.62 | 0.16 | 0.12 | 15.6 | 4.98 | 32.4 | 0.28 | 1.22 | 5.49 | 6.57 | 7.69 |
| 11 | 4.23 | 26.1 | 17.5 | 10.9 | 10.3 | 0.13 | 0.18 | 8.12 | 0.19 | 5.82 | 0.35 | 0.67 | 4.14 | 9.77 | 11.4 |
| 12 | 4.88 | 26.2 | 25 | 9.36 | 6.8 | 0.1 | 0.08 | 7.01 | 1.21 | 17.8 | 0.28 | 0.95 | 5.12 | 8.7 | 10.2 |
| 13 | 7.56 | 26.8 | 25.8 | 10.8 | 3.47 | 0.11 | 0.09 | 3.49 | 2.96 | 2.8 | 0.35 | 0.96 | 3.41 | 8.59 | 10.1 |
| 14 | 7.27 | 27.7 | 19.9 | 12.6 | 7.84 | 0.13 | 0.106 | 7.72 | 3.08 | — | 0.42 | 0.72 | 2.74 | 11 | 12.9 |
| 15 | 7.74 | 29.6 | 18.3 | 13.6 | 4.4 | 0.108 | 0.089 | 4.69 | 1.39 | — | 0.45 | 0.62 | 2.36 | 11.6 | 13.6 |
| 16 | 6.82 | 25.8 | 13.2 | 14.1 | 5.1 | 0.089 | 0.073 | 1.67 | 3.04 | — | 0.54 | 0.51 | 1.94 | 11.8 | 13.8 |
| 17 | 6.47 | 24.8 | 13.4 | 16.7 | 4 | 0.089 | 0.073 | 1.82 | 5.31 | — | 0.61 | 0.54 | 2.07 | 10.7 | 12.5 |
| 18 | 5.94 | 21.4 | 16 | 19.6 | 5.6 | 0.089 | 0.073 | 2.43 | 4.43 | — | 0.68 | 0.75 | 2.69 | 9.26 | 10.9 |
| 19 | 5.74 | 19.9 | 22.8 | 10.1 | 11.4 | 0.089 | 0.073 | 5.24 | 4.64 | — | 0.37 | 1.15 | 3.97 | 7.57 | 8.87 |
| 20 | 4.18 | 17 | 21.6 | 11.9 | 9.3 | 0.089 | 0.073 | 5.62 | 9.31 | — | 0.42 | 1.27 | 5.17 | 7.16 | 8.39 |
| 21 | 5.46 | 19.1 | 22.7 | 16.7 | 8.5 | 0.089 | 0.073 | 3.41 | 4.52 | — | 0.53 | 1.19 | 4.16 | 7.18 | 8.41 |

Traces amounts of CoO, NiO, CuO, ZnO, PbO < 0.01% S = $SiO_2$; A = $Al_2O_3$; M = MgO

TABLE 13

REE chemical composition in the Slag

| Test | La ppm | Ce Ppm | Pr ppm | Nd Ppm | Sm Ppm | Eu ppm | Gd Ppm | Dy Ppm | Ho Ppm | Er Ppm | Tm Ppm |
|---|---|---|---|---|---|---|---|---|---|---|---|
| 1 | 11550 | 20050 | 1790 | 8199 | 1128 | 279 | 799 | 389 | 60.3 | 175 | 17.9 |
| 2 | 8570 | 14700 | 1360 | 6525 | 905 | 227 | 552 | 314 | 48.4 | 140 | 14.3 |
| 3 | 14900 | 26500 | 2430 | 8960 | 1131 | 333 | 997 | 441 | 73.0 | 168 | 20.0 |
| 4 | 13800 | 24400 | 2260 | 8400 | 1096 | 325 | 923 | 426 | 70.0 | 171 | 19.0 |
| 5 | 12835 | 21064 | 2302 | 7986 | 1198 | 317 | 1088 | 472 | 78 | 205 | 26.3 |
| 6 | 21601 | 42805 | 4328 | 19338 | 2327 | 829 | 1416 | 972 | 170 | 380 | 50.4 |
| 7 | 24114 | 48756 | 4935 | 14227 | 2225 | 447 | 1572 | 670 | 112 | 260 | 38.3 |
| 8 | 23142 | 46677 | 4742 | 13568 | 2131 | 431 | 1507 | 636 | 107 | 227 | 36.6 |
| 9 | 20092 | 31385 | 3576 | 9863 | 1656 | 740 | 434 | 576 | 92.2 | 304 | 29.0 |
| 10 | 17673 | 27398 | 3226 | 9082 | 1560 | 702 | 387 | 508 | 81.8 | 271 | 26.0 |
| 11 | 22994 | 41985 | 4175 | 15364 | 2339 | 621 | 3978 | 653 | 136 | 287 | 48.3 |
| 12 | 20453 | 37770 | 3724 | 13659 | 2059 | 531 | 3408 | 566 | 117 | 246 | 40.8 |
| 13 | 22659 | 34902 | 3898 | 15130 | 1768 | 817 | 482 | 621 | 101 | 338 | 33 |
| 14 | 28023 | 47152 | 5161 | 18198 | 2560 | 689 | 2240 | 961 | 159 | 418 | 53.7 |
| 15 | 29459 | 49500 | 5444 | 19144 | 2685 | 727 | 2420 | 1048 | 173 | 456 | 58.3 |
| 16 | 28970 | 57197 | 5232 | 15077 | 2335 | 603 | 1816 | 785 | 153 | 364 | 53.6 |

TABLE 13-continued

| REE chemical composition in the Slag | | | | | | | | | | | |
|---|---|---|---|---|---|---|---|---|---|---|---|
| 17 | 26989 | 49852 | 4891 | 14067 | 2213 | 575 | 1726 | 740 | 146 | 343 | 50.8 |
| 18 | 23589 | 43524 | 3593 | 12309 | 1936 | 500 | 1505 | 642 | 127 | 297 | 44.1 |
| 19 | 19429 | 32083 | 3569 | 12516 | 1756 | 550 | 1654 | 698 | 113 | 292 | 38.8 |
| 20 | 18381 | 30337 | 3385 | 11851 | 1670 | 521 | 1564 | 660 | 106 | 276 | 36.4 |
| 21 | 18348 | 30478 | 3395 | 11848 | 1661 | 526 | 1595 | 663 | 106 | 277 | 36.6 |

| Test | Yb Ppm | Lu ppm | Y Ppm | Tb ppm | Th Ppm | U ppm | REE ppm | $RE_2O_3$ (REO) ppm |
|---|---|---|---|---|---|---|---|---|
| 1 | 118 | 15.4 | 1770 | 113 | — | — | 4.65 | 5.44 |
| 2 | 96.3 | 12.4 | 1320 | 91.5 | — | — | 3.49 | 4.09 |
| 3 | 164 | 21.0 | 2162 | 101 | 487 | 201 | 5.84 | 6.84 |
| 4 | 152 | 20.0 | 2110 | 100 | 455 | 184 | 5.43 | 6.36 |
| 5 | 163 | 22.6 | 5731 | 124 | 401 | 112 | 5.36 | 6.28 |
| 6 | 257 | 45.3 | 3904 | 139 | — | — | 9.86 | 11.60 |
| 7 | 208 | 32.2 | 3645 | 191 | 780 | 270 | 10.1 | 11.9 |
| 8 | 182 | 29.9 | 3568 | 181 | 886 | 289 | 9.72 | 11.4 |
| 9 | 359 | 34.7 | 4154 | 160 | 863 | 277 | 7.35 | 8.61 |
| 10 | 318 | 31.0 | 4258 | 146 | 792 | 250 | 6.57 | 7.69 |
| 11 | 345 | 52.6 | 4245 | 457 | — | — | 9.77 | 11.5 |
| 12 | 291 | 44.0 | 3731 | 391 | — | — | 8.70 | 10.2 |
| 13 | 404 | 40 | 4552 | 185 | 963 | 309 | 8.59 | 10.1 |
| 14 | 334 | 46.2 | 4145 | 261 | 787 | 189 | 11.0 | 12.9 |
| 15 | 362 | 49.9 | 4547 | 275 | 863 | 210 | 11.6 | 13.6 |
| 16 | 321 | 44.6 | 5015 | 210 | 986 | 256 | 11.8 | 13.8 |
| 17 | 305 | 42.0 | 4786 | 199 | 987 | 249 | 10.7 | 12.5 |
| 18 | 264 | 36.4 | 4090 | 172 | 859 | 245 | 9.26 | 10.9 |
| 19 | 234 | 32.5 | 2536 | 195 | 862 | 452 | 7.57 | 8.87 |
| 20 | 220 | 30.4 | 2420 | 185 | 894 | 436 | 7.16 | 8.39 |
| 21 | 221 | 30.8 | 2399 | 187 | 941 | 433 | 7.18 | 8.41 |

The Effect of Refractory on REO Grade and Slag Quality.

As indicated in Table 13 and Table 14, the concentration of REO in the slag phase varied from 4.09 to 13.80%, dependent on the smelting conditions. At its highest, the total rare-earth element in the slag is up to about 5 times its concentration in the ore, a significant upgrade. The chemical erosion is acute in the alumina crucible while it is still significant in the MgO crucibles. Consequently, slags of relatively lower REO concentrations are produced in the test work conducted in alumina and magnesite crucibles while higher REO concentrations are obtained in the tests conducted in graphite crucibles (Tests 6-21).

Based on the above evaluations of effects of crucible erosion on the slag quality, a carbon based refractory would be recommended in order to minimise slag contamination and thus maximise slag REO grade. Operating the furnace with a freeze line can achieve similar results to those for the smelting in the carbon crucible; this option is highly recommended.

Producing a higher slag REO grade and lowering the level of deleterious impurities in the slag is very important as it will decrease the consumption of reagents in the hydrometallurgical circuits and ultimately lower the plant size and cost, which will impact positively on the process economics.

Alloy Quality

The compositions of the iron alloy produced are presented in Table 15. A carbon-saturated iron-manganese alloy was produced from these tests. In the smelting process, iron was preferentially reduced over manganese. The reduction of iron was almost complete in all the various conditions investigated. The composition of the alloy appeared to be strongly related to the extent of manganese reduction. For instance, increase of manganese reduction increases the alloy manganese content while it decreases its iron concentration by dilution.

As manganese oxide is an undesirable impurity in the leaching process contributing to increased acid consumption, its reduction to the alloy in the smelting step should be optimised. The reduction of manganese oxide is affected by the reductant addition, temperature and slag basicity index. MnO reduction in the graphite crucible tests fluxed with CaO is even better due to higher slag basicity index. There is a noticeable difference in the reduction of FeO and MnO for Test 5 carried out in a magnesite crucible compared to the results achieved in the graphite crucibles with CaO fluxing.

TABLE 15

| Alloy analyses | | | | | | | | | | | | | |
|---|---|---|---|---|---|---|---|---|---|---|---|---|---|
| Test | Si % | Ti % | V % | Mn % | Cr % | Cu % | Ni % | Ca % | Fe % | Mg % | Al % | P % | C % |
| 1 | 0.75 | 0.25 | 0.15 | 7.1 | 0.08 | 0.03 | 0.16 | 0.18 | 88.5 | 0.04 | 0.6 | 0.72 | 1.55 |
| 2 | 0.03 | 0.05 | 0.04 | 1.06 | 0.04 | 0.02 | 0.1 | 0.11 | 96.8 | 0.02 | 0.39 | 0.71 | 0.6 |
| 3 | 0.61 | 0.14 | 0.03 | 0.86 | 0.04 | 0.02 | 0.04 | 0.07 | 94 | 0.02 | 0.43 | 3.42 | 0.35 |
| 4 | 0.47 | 0.03 | 0.01 | 0.14 | 0.02 | 0.02 | 0.06 | 0.01 | 96.1 | 0.01 | 0.08 | 3.01 | 0.08 |
| 5 | 2.61 | 0.71 | 0.12 | 11.9 | 0.05 | 0.02 | 0.04 | 0.05 | 79.5 | 0.05 | 0.14 | 0.72 | 4.08 |
| 6 | 3.3 | 0.35 | 0.1 | 10.1 | 0.05 | 0.05 | 0.05 | 0.05 | 81.2 | 0.05 | 0.14 | 0.83 | 3.77 |
| 7 | — | — | — | — | — | — | — | — | — | — | — | — | — |
| 8 | — | — | — | — | — | — | — | — | — | — | — | — | — |

TABLE 15-continued

| Alloy analyses | | | | | | | | | | | | | |
|---|---|---|---|---|---|---|---|---|---|---|---|---|---|
| Test | Si % | Ti % | V % | Mn % | Cr % | Cu % | Ni % | Ca % | Fe % | Mg % | Al % | P % | C % |
| 9 | 0.84 | 0.85 | 0.12 | 11.8 | 0.08 | 0.06 | 0.03 | 0.36 | 79.7 | 0.17 | 0.69 | 0.72 | 4.63 |
| 10 | 4.12 | 1.31 | 0.12 | 12.5 | 0.08 | 0.07 | 0.04 | 0.08 | 75.5 | 0.05 | 0.45 | 0.73 | 4.98 |
| 11 | — | — | — | — | — | — | — | — | — | — | — | — | — |
| 12 | — | — | — | — | — | — | — | — | — | — | — | — | — |
| 13 | — | — | — | — | — | — | — | — | — | — | — | — | — |
| 14 | 2.52 | 0.96 | 0.13 | 13.7 | 0.08 | 0.01 | 0.04 | 0.13 | 75.8 | 0.08 | 0.24 | 0.72 | 5.63 |
| 15 | 0.78 | 0.67 | 0.11 | 12 | 0.08 | 0.03 | 0.04 | 0.19 | 83.9 | 0.09 | 0.34 | 0.73 | 4.09 |
| 16 | 4.56 | 0.37 | 0.1 | 12.4 | 0.05 | 0.05 | 0.05 | 0.1 | 79.2 | 0.05 | 0.26 | 1.26 | 1.57 |
| 17 | 5.74 | 0.71 | 0.12 | 11.2 | 0.07 | 0.05 | 0.05 | 0.13 | 76.9 | 0.05 | 0.29 | 1.25 | 3.48 |
| 18 | 4.96 | 0.7 | 0.12 | 11.6 | 0.05 | 0.05 | 0.05 | 0.13 | 74.9 | 0.05 | 0.2 | 1.29 | 4.9 |
| 19 | 1.72 | 0.39 | 0.13 | 11.4 | 0.04 | 0.05 | 0.04 | 0.09 | 81.5 | 0.04 | 0.26 | 0.69 | 3.68 |
| 20 | 1.72 | 0.38 | 0.12 | 11.4 | 0.04 | 0.04 | 0.04 | 0.07 | 81.6 | 0.02 | 0.26 | 0.72 | 3.55 |
| 21 | 1.47 | 0.49 | 0.12 | 11.9 | 0.03 | 0.1 | 0.03 | 0.05 | 81.1 | 0.02 | 0.11 | 0.72 | 3.85 |

Carbon and Phosphorus in the Metal

Saturated-carbon iron-manganese alloys are produced in the crucible smelting tests. The highest levels of P are from Tests 3 and 4. These tests were conducted at relatively lower temperature and anthracite addition in the recipe is less than the stoichiometric amount. As a consequence, a lower amount of metal is produced while $P_2O_5$ is almost fully reduced to the alloy.

The metal composition corresponding to the optimal slag production is considered as being the optimal metal composition. Optimal metals are produced in Test 6, and Tests 16 and 17. Based on these recipes, the optimal alloy composition produced from this particular Zandkopsdrift ore sample would be: 75-79% Fe, 10-12.5% Mn, 2-4% C, 3-6% Si and 0.7-1.3% P. This alloy composition falls within the commercial manganese steel composition range which consists of 11-13% Mn.

Metal to Slag Ratio

The metal to slag ratios reported in Table 16, were calculated only for the tests which resulted in good slag-metal separation. These results were compared to the theoretical values of the metal to slag ratio calculated using Pyrosim and FactSage. These ratios can be used to assess the extent of contamination of the slag by crucible erosion, the extent of reduction relative to the predictions, and the mass pull of the REE containing slag relative to the ore.

TABLE 16

| Metal to slag ratio | | | | | | |
|---|---|---|---|---|---|---|
| Test | Anthracite(%) | Alloy(g) | Slag(g) | Metal/slag | Crucible | T oC |
| Pyrosim | 100 | 49.0 | 30.0 | 1.56 | | 1700 |
| FactSage | 100 | 45.1 | 30.8 | 1.46 | | 1700 |
| 1 | 100 | 40.8 | 34.0 | 1.20 | Al | 1700 |
| 2 | 90 | 34.5 | 22.9 | 1.51 | Al | 1700 |
| 3 | 80 | 36.8 | 40.5 | 0.91 | Al | 1600 |
| 4 | 70 | 36.5 | 41.5 | 0.88 | Al | 1600 |
| 5 | 100 | 42.9 | 35.2 | 1.22 | Mg | 1700 |
| 6 | 100 | 158 | 107 | 1.48 | G | 1700 |
| 7-13 | 100 | — | — | — | G | 1700 |
| 14 | 100 | 63.4 | 63.6 | 0.997 | G | 1700 |
| 15 | 100 | 164 | 85.0 | 1.94 | G | 1800 |
| 16 | 100 | 44.3 | 22.0 | 2.01 | G | 1700 |
| 17 | 100 | 43.4 | 24.2 | 1.79 | G | 1700 |
| 18 | 100 | 42.9 | 27.9 | 1.54 | G | 1700 |
| 19 | 100 | 42.1 | 28.7 | 1.47 | G | 1600 |
| 20 | 100 | 40.6 | 30.9 | 1.31 | G | 1600 |
| 21 | 100 | 42.5 | 32.0 | 1.33 | G | 1600 |

The metal-to-slag ratio of the fluxless smelting conditions for Tests 3 and 4 conducted with anthracite additions below the stoichiometric amount is relatively lower due to the presence of unreduced FeO and MnO in the slag and also due to significant crucible erosion that increases the slag volume.

Higher ratios were achieved in the graphite crucible unfluxed tests. The high ratios are attributed to the following factors: minimal flux addition, absence of crucible erosion, and increased MnO reduction to the alloy.

A metal-to-slag ratio of 1.48 is measured in Test 6; which is closer to the values predicted using Pyrosim and FactSage models. Test 15 which is a repeat of Test 6 at a higher temperature resulted in a ratio of 1.94. The Test 15 ratio is the highest as a result of better metal-slag separation as well as higher MnO reduction.

Compared to Test 6, Tests 16 to 21 resulted in relatively higher metal-to-slag ratios which decreased with increasing CaO addition. Lime addition promoted the reduction of MnO, improved the metal-slag separation, and also diluted the slag. The metal-to-slag ratio results indicative that, for the purpose of producing a leachable slag feed of higher REO concentration, a higher metal-to-slag ratio must be targeted by minimising crucible erosion or the contamination of the slag with crucible material. This can be done either by using a carbon based refractory or by developing a crucible freeze line during operation.

Recoveries to Slag and Metal

The recoveries of REE and metal oxides to the slag phase are given in Table 18 and Table 20, respectively. Recoveries to the alloy are given in Table 20. Recoveries are only calculated for tests yielding good metal-slag separation.

Recoveries to Slag

Rare earth oxides are stable at the conditions of the reduction of iron oxides. Tests 6 to 21 carried out in graphite crucibles resulted in REE recoveries ranging from 80 to 100%. These tests and particularly those yielding a clean metal-slag separation demonstrated that all the rare earth oxides would report to the slag phase at the smelting conditions investigated.

The distribution of rare earths in the product streams was calculated based on the REE analyses and masses of the slag and metal produced. The concentration of TREEs in selected alloys is very low as indicated in Table 17, FeO and MnO are significantly reduced at higher slag basicity index. This appeared specifically in Tests 16 to 21 fluxed with CaO. The recoveries of FeO to the slag in all these tests are below 3%, indicating that FeO is effectively reduced in all the test work despite poor metal-slag separation in some tests. However about 40% of MnO stayed unreduced in the slag.

TABLE 17

REE Analyses of selected alloy

| Test | Ce ppm | Dy Ppm | Er ppm | Gd Ppm | La ppm | Nd ppm | Pr ppm | Sc ppm | Sm ppm | Tm ppm | Y ppm | Yb ppm | Th ppm | U ppm |
|---|---|---|---|---|---|---|---|---|---|---|---|---|---|---|
| 6 | 250 | 5.26 | 1.96 | 15.9 | 143 | 123 | 31.3 | 17.8 | 1.32 | 10.7 | 1.18 | | 6.95 | 50.10 |
| 16 | 155 | 2.80 | 1.49 | 7.00 | 98.9 | 59.2 | 18.3 | 66.4 | 8.22 | 1 | 15.4 | 1 | 8.65 | 31.5 |
| 17 | 49.8 | 1 | 1 | 2.16 | 25.1 | 18.1 | 5.50 | 41.3 | 2.63 | 1 | 5.68 | 1 | 6.10 | 30.4 |
| 18 | 48.7 | 1.49 | 9.75 | 11.2 | 27.3 | 14.6 | 5.80 | 1 | 1.96 | 2.50 | 11.6 | 6.98 | 6.35 | 24.9 |

TABLE 18

Recoveries of REE to the slag phase

| Test | La % | Ce % | Pr % % | Nd % | Sm % | Eu % | Gd % | Dy % | Ho % | Er % | Tm | Yb | Lu) | Y | Tb | REO/ $Re_2O_3$ |
|---|---|---|---|---|---|---|---|---|---|---|---|---|---|---|---|---|
| 1 | 57.4 | 60.2 | 49.6 | 67.2 | 86.3 | 80.7 | 76.2 | 80.6 | 55.0 | 51.7 | 47.8 | 53.4 | 50.9 | 62.6 | 95.0 | 62.7 |
| 2 | 41.2 | 42.7 | 36.4 | 51.8 | 67.0 | 63.4 | 51.0 | 62.8 | 42.7 | 47.6 | 36.9 | 42.1 | 39.8 | 45.2 | 74.7 | 45.5 |
| 3 | 88.1 | 94.7 | 80.1 | 87.4 | 103 | 115 | 113 | 107 | 79.2 | 70.4 | 63.5 | 88.3 | 82.8 | 91.1 | 101 | 93.8 |
| 4 | 83.6 | 89.3 | 76.3 | 84.0 | 102 | 116 | 107 | 107 | 77.8 | 73.4 | 61.8 | 83.8 | 80.8 | 91.0 | 103 | 89.3 |
| 5 | 66.1 | 65.4 | 66.1 | 67.7 | 94.8 | 94.9 | 107 | 101 | 73.4 | 74.8 | 72.7 | 76.4 | 77.5 | 210 | 109 | 74.8 |
| 6 | 84.3 | 101 | 94.1 | 125 | 140 | 188 | 106 | 158 | 122 | 105 | 106 | 91.1 | 118 | 108 | 92.2 | 105 |
| 7-13 | — | — | — | — | — | — | — | — | — | — | — | — | — | — | — | — |
| 14 | 130 | 132 | 134 | 140 | 183 | 186 | 200 | 186 | 135 | 138 | 134 | 141 | 143 | 137 | 206 | 139 |
| 15 | 91.5 | 92.8 | 94.2 | 98.1 | 128 | 131 | 144 | 136 | 98.3 | 100 | 97.2 | 102 | 103 | 101 | 145 | 98.1 |
| 16 | 93.1 | 111 | 93.7 | 80.0 | 116 | 113 | 112 | 105 | 90.4 | 82.8 | 92.4 | 94.0 | 95.7 | 115 | 114 | 103 |
| 17 | 95.5 | 106 | 96.4 | 82.1 | 121 | 118 | 117 | 109 | 94.5 | 86.0 | 96.5 | 98.1 | 99.1 | 121 | 119 | 103 |
| 18 | 96.2 | 107 | 81.6 | 82.8 | 122 | 119 | 118 | 109 | 94.9 | 86.0 | 96.5 | 98.0 | 99.1 | 119 | 119 | 103 |
| 19 | 81.5 | 81.3 | 83.4 | 86.6 | 113 | 134 | 133 | 122 | 86.6 | 86.9 | 87.4 | 89.4 | 91.0 | 75.8 | 139 | 86.2 |
| 20 | 83.0 | 82.7 | 85.2 | 88.3 | 116 | 137 | 136 | 124 | 88.0 | 88.4 | 88.3 | 90.4 | 91.5 | 77.8 | 142 | 87.8 |
| 21 | 85.8 | 86.1 | 88.5 | 91.4 | 120 | 143 | 143 | 129 | 91.3 | 91.7 | 91.9 | 94.2 | 95.9 | 79.9 | 149 | 91.1 |

TABLE 19

Recoveries of Oxides

| Test | MgO % | $Al_2O_3$ % | $SiO_2$ % | CaO % | $TiO_2$ % | $V_2O_5$ % | $Cr_2O_3$ % | MnO % | FeO % |
|---|---|---|---|---|---|---|---|---|---|
| 1 | 60.9 | 196 | 49.3 | 45.2 | 64.2 | 26.1 | 81.3 | 32.3 | 1.64 |
| 2 | 51.3 | 200 | 43.5 | 37.1 | 53.8 | 38.4 | 107 | 39.9 | 2.01 |
| 3 | 60.9 | 137 | 77.1 | 68.6 | 90.1 | 80.8 | 96.8 | 71.2 | 3.26 |
| 4 | 49.9 | 101 | 64.1 | 58.1 | 78.5 | 76.4 | 103 | 66.5 | 9.01 |
| 5 | 546 | 59.6 | 75.5 | 36.7 | 84.7 | 27.0 | 84.2 | 23.9 | 0.68 |
| 6 | 87.6 | 81.1 | 73.4 | 77.6 | 70.8 | 21.9 | 68.2 | 14.3 | 1.66 |
| 7-13 | — | — | — | — | — | — | — | — | — |
| 14 | 145 | 110 | 70.0 | 117 | 63.1 | 35.4 | 110 | 22.6 | 1.93 |
| 15 | 103 | 78.3 | 43.1 | 84.0 | 23.6 | 19.8 | 61.8 | 9.17 | 0.58 |
| 16 | 94.0 | 70.6 | 32.0 | 91.0 | 28.5 | 16.9 | 52.6 | 3.37 | 1.32 |
| 17 | 98.0 | 74.6 | 35.7 | 117 | 24.3 | 18.6 | 57.9 | 4.05 | 2.53 |
| 18 | 104 | 74.2 | 49.3 | 159 | 39.2 | 21.4 | 66.7 | 6.23 | 2.43 |
| 19 | 103 | 71.2 | 72.2 | 84.0 | 82.7 | 22.0 | 68.7 | 13.8 | 2.62 |

TABLE 19-continued

| Recoveries of Oxides | | | | | | | | | |
|---|---|---|---|---|---|---|---|---|---|
| Test | MgO % | $Al_2O_3$ % | $SiO_2$ % | CaO % | $TiO_2$ % | $V_2O_5$ % | $Cr_2O_3$ % | MnO % | FeO % |
| 20 | 80.9 | 65.4 | 73.8 | 107 | 73.0 | 23.7 | 73.9 | 16.0 | 5.70 |
| 21 | 109 | 76.0 | 80.2 | 155 | 68.4 | 24.6 | 76.6 | 10.0 | 2.84 |

TABLE 20

| Recoveries to metal | | | | | | | | | | | | |
|---|---|---|---|---|---|---|---|---|---|---|---|---|
| Test | Si (%) % | Ti(%) % | V(%) % | Mn(%) % | Cr(%) % | Cu(%) % | Ni(%) % | Ca(%) % | Fe(%) % | Mg(%) % | Al(%) % | P(%) % |
| 1 | 7.20 | 4.22 | 91 | 34.4 | 149.3 | 24.5 | 126 | 2.99 | 101 | 1.84 | 5.71 | 22.5 |
| 2 | 0.204 | 0.713 | 21.1 | 4.34 | 71.0 | 16.6 | 69.0 | 1.55 | 94.0 | 0.752 | 3.16 | 18.7 |
| 3 | 5.02 | 2.06 | 16.0 | 3.56 | 59.9 | 11.8 | 30.6 | 1.02 | 92.0 | 0.795 | 3.52 | 91.2 |
| 4 | 4.05 | 0.416 | 5.60 | 0.61 | 36.7 | 14.6 | 42.3 | 0.07 | 98.7 | 0.190 | 0.687 | 84.1 |
| 5 | 26.5 | 12.9 | 79.1 | 30.5 | 102.7 | 19.7 | 30.0 | 0.87 | 91.2 | 2.23 | 1.41 | 23.6 |
| 6 | 30.8 | 5.84 | 58.9 | 47.5 | 94.6 | 39.6 | 39.6 | 0.81 | 86.8 | 2.05 | 1.30 | 25.1 |
| 7-13 | — | — | — | — | — | — | — | — | — | — | — | — |
| 14 | 18.9 | 12.8 | 63.2 | 51.6 | 121 | 3.17 | 21.5 | 1.68 | 67.5 | 2.63 | 1.79 | 17.6 |
| 15 | 7.60 | 11.6 | 69.3 | 58.3 | 157 | 21.3 | 31.2 | 3.18 | 93.4 | 3.83 | 3.28 | 22.9 |
| 16 | 47.7 | 6.90 | 65.3 | 65.3 | 112 | 44.3 | 44.3 | 1.75 | 98.7 | 2.30 | 2.66 | 42.8 |
| 17 | 58.8 | 13.0 | 79.9 | 57.7 | 152 | 43.4 | 43.4 | 2.30 | 93.8 | 2.25 | 2.96 | 41.6 |
| 18 | 50.3 | 12.7 | 79.0 | 59.1 | 103 | 42.9 | 42.9 | 2.27 | 91.6 | 2.23 | 2.02 | 42.5 |
| 19 | 17.1 | 6.90 | 80.8 | 57.0 | 72.5 | 38.3 | 30.7 | 1.57 | 96.5 | 1.51 | 2.53 | 22.3 |
| 20 | 16.5 | 6.50 | 74.8 | 55.0 | 85.5 | 33.3 | 29.2 | 1.21 | 93.2 | 0.97 | 2.48 | 22.4 |
| 21 | 14.8 | 8.80 | 78.3 | 60.1 | 61.0 | 85.0 | 27.2 | 0.83 | 97.0 | 0.75 | 1.10 | 23.3 |

Recoveries of Fe, P and Mn to the Metal Phase

As indicated in Table 20, the recovery of Fe to the alloy calculated on the basis of the content of this element in the feed ranged between 86% and 98%. This further validates that the reduction of FeO in the tests conducted is effective despite of poor metal and slag separation in some tests.

The recoveries of P to the metal are highest at low anthracite additions and lowest at high anthracite additions and temperatures.

However in Test 16 conducted in a graphite crucible at 1700° C., with 1% CaO flux addition in the smelting recipe, the highest proportion of REEs is present in the Ca-Silicate phase, lower amounts are detected in the CaAl silicate and the Ba-rich Ca-silicate phases as can be seen in FIG. 12. This distribution is similar to that of Test 6 slag.

Conclusion of the Smelting Tests

Laboratory smelting test work demonstrated that the smelting of the ZKD ore can be conducted without flux addition at a temperature of about 1700° C. However the temperature of the smelting can be decreased to about 1600° C. with the addition of fluxes.

Fluxless smelting in various crucible types demonstrated that a graphite or carbon-based refractory should be used as it minimises the contamination (dilution) of the slag product and thus results in higher concentration of REE in the slag. Operating the furnace with an efficient freeze line is however highly recommended to prevent crucible erosion.

Fluxing with a minimal lime addition of 1 to 7% relative to the ore is investigated. This provided a clean metal-slag separation and promoted the MnO reduction. Fluxing with minimal CaO (1-3%) minimises acid consumption in the leaching step and it will improves the reduction of MnO whilst producing a high REO grade slag.

4. Leaching

Various slag samples produced in the smelting tests were subjected to leaching in order to determine the amenability of the rare-earth elements to leaching. Three leaching methods as listed below were explored to determine the most economical route to be used:

1. Acid baking,
2. Sodium hydroxide cracking followed by HCl leach,
3. Direct HCl leach Acid Baking and Water Leaching The slag used in the acid baking leaching tests was produced in the 100 kVA furnace in Test 25 in an alumina crucible furnace. It was saturated with $Al_2O_3$ (due to crucible erosion), and had a low concentration of TREE and a high MnO content. The slag composition in REEs and other metal elements is shown in Table 25 and Table 26, respectively. La and Ce are the major REE elements present in the feed solids, constituting almost 70% of the total rare earth elements (TREE) content of 3.76%. The major impurities in the sample are Fe, Mn, Si, Mg, Ca and Al.

Acid Baking Procedure

The slag was contacted with a pre-determined amount of concentrated $H_2SO_4$ (98% (m/m). The mixture of the acid and slag was weighed and transferred into a baking tray. The acid contacted slag was baked in an oven at specified test temperature. At the end of the baking period, the samples were weighed prior to subjecting them to water leach.

The baked samples were subjected to water leach to solubilise the rare-earth sulphates; deionised water was used as the lixiviant. Water leaching was conducted for 2 hour residence time, at a pulp density of 20% (m/m). At the end of the test, the entire reactor content was filtered. The filtrate volume was measured and wet un-washed cake weighed. The weighed cake was washed three times initially with pH adjusted water and thereafter with deionised water at a ratio of 1:5 (i.e. for 1 kg of sample 5 L of deionised water is used).

NaOH Cracking and Water Leaching

Caustic Cracking Procedure

The slag sample was subjected to cracking with 50% sodium hydroxide (NaOH), for a period of 4 hours, at a temperature of 140° C. and initial pulp density of 20% (m/m). At the end of the test the entire slurry was diluted with deionised water then filtered. The filtered wet cake was then re-pulped once with deionised water to remove entrained Na and dried in an oven overnight prior to water leaching. The filtrate were residue are measured and analysed for REE and base metals.

The residues from the caustic cracking tests were used as feed for the water leach. The water leach test was conducted in order to wash entrained Na in the sample. The washed residue from the water leach test was then subjected to HCl leach. The HCl leach was conducted in order to dissolve the REE hydroxides and recover them in the chloride form. One test was conducted using glucose as a reductant and another test was conducted without a reductant. The addition of glucose into the slurry was aimed at reducing the Ce (IV) in order to improve the leaching of other REE in the sample. A stoichiometric amount of glucose was added upfront targeting 120% stoichiometry based on total Ce in feed. Both tests was conducted at 40° C., targeting a pH value of 1.5, for 4 hours.

Direct HCl Leach

The slag was milled and then slurried in HCl solution (16% (m/m) or 32% (m/m), targeting the required target pulp density (10% and 20%) and agitated. The temperature was then increased to 60° C. After 3 hours of reaction, the mixture was filtered and the mass of the wet unwashed residues was recorded. The filtered cake was weighed, subsequently re-slurried and washed three times, initially with acidified deionised water (deionised water acidified to the pH of slurry) and thereafter with deionised water. The cake was initially washed at a ratio of 1 times the mass of wash liquor to the wet cake mass and the second and third washes at a ratio of 5 times the mass of the wash liquor to the wet cake mass.

Leaching efficiency levels of about 95% were attained in the direct hydrochloric acid leaching; other leaching methods all resulted in leaching efficiencies of less than 60%.

The economic viability of the process shown in the accompanying flow sheet depends largely on mining and electricity costs and on the total rare-earth element grade of the ore 10. The nature of the furnace crucible which is used during the smelting step 14 can have an effect on technical and economic aspects of the method of the invention. If a graphite crucible is used then the slag 20 need not necessarily be fluxed and direct HCl leaching of the unfluxed slag can be effected. Tests have shown that total rare-earth element leaching efficiencies ranging between 93% and 96%, at different acid dosages, were achieved. Additionally it has been demonstrated that direct HCl leaching of the slag, compared to acid baking and caustic (NaOH) cracking, is preferable. It has also been observed that the extraction efficiency of light rare-earth elements which include La, Ce, Nd and Pr is lowered when the slag is treated with a flux prior to leaching.

A benefit of the fluxing process is that the temperature of the smelting can be decreased from about 1700° to 1600° C. Use of a graphite or carbon-based refractory crucible is preferable as it minimizes the contamination of the slag product and this results in a higher concentration of the rare-earth elements in the slag. It has been noted that due to the effect of chemical erosion the rare-earth oxide grade of the slag produced in an alumina crucible or in an MgO crucible is relatively lower compared to that of the slag produced in a graphite crucible. Virtually no slag contamination took place through the use of a graphite crucible.

The invention claimed is:

1. A method of processing an iron-rich rare earth-bearing ore which includes a step of carbothermic smelting of the ore to produce a slag, the smelting step being regulated to control a level of residual FeO in the slag and to concentrate rare earth oxide minerals in a leachable species in the slag wherein the slag, after solidification, is milled to a size of 35 micron, and the milled slag is leached in hydrochloric acid to extract the rare earth oxide minerals from the milled slag, and wherein, during the smelting step, iron and manganese oxides in the ore are reduced to a pig iron in a metal phase.

2. A method according to claim 1 wherein addition of reductant in the smelting step regulates the residual FeO to achieve at least 98% iron reduction by weight.

3. A method according to claim 1 wherein addition of flux in the smelting step is carried out to promote breakage of bonds between spinel phases, rare earth oxide species and other phases in the slag which hinder leaching.

4. A method according to 1 wherein smelting of the ore is achieved through use of a graphite or carbon-based refractory crucible.

5. A method according to claim 3 wherein the flux is selected from lime, $Na_2CO_3$, $K_2CO_3$ and borax.

6. A method according to claim 1 which includes a step of increasing residual FeO in the slag to lower an operating temperature and reduce formation of perovskite in the slag.

7. A method according to claim 1 which includes a step of fluxing the slag with lime or CaO to promote MnO reduction.

* * * * *